UNITED STATES PATENT OFFICE.

HAROLD N. COX, OF GLEN RIDGE, NEW JERSEY, ASSIGNOR TO NEW JERSEY PATENT COMPANY, OF WEST ORANGE, NEW JERSEY, A CORPORATION OF NEW JERSEY.

PRODUCTION OF ELECTRODES FOR GALVANIC BATTERIES.

1,366,559.  Specification of Letters Patent.  Patented Jan. 25, 1921.

No Drawing.  Application filed April 12, 1919.  Serial No. 289,644.

*To all whom it may concern:*

Be it known that I, HAROLD N. COX, a citizen of the United States, and a resident of Glen Ridge, Essex county, New Jersey, have invented certain new and useful Improvements in the Production of Electrodes for Galvanic Batteries, of which the following is a description.

My invention relates to the production of electrodes for galvanic batteries, and more particularly those employing a caustic alkaline electrolyte, and in which the negative electrode consists of an element or elements of oxid of copper or other depolarizing agent and the positive electrode consists of an element or elements of zinc.

In batteries of this type, the negative electrodes are usually made in the form of plates or cylinders molded from a mass of finely divided oxid of copper. As oxid of copper is a material the particles of which have very slight attraction for each other, it has heretofore been necessary in forming such electrodes to subject the finely divided copper oxid to an enormous pressure in molding and to then bake or heat the molded element for a considerable period under a red heat in order to properly agglomerate and harden the same. It has also been customary before molding the finely divided oxid of copper, to mix a slight amount of alkaline water therewith.

The principal object of my invention is to produce an improved electrode of this character which will be more uniform in structure and which will be self-sustaining and sufficiently hard and strong for practical use, without subjecting the same to the usual baking operation.

My invention also resides in the method of making my improved electrode.

I have found that molded oxid of copper electrodes in which an electrolyte, such, for example, as sodium hydroxid or an ammonium salt, but preferably ammonium chlorid, or a mixture of the same either with finely divided zinc, metallic iron, iron reduced by hydrogen, or any other metal which will reduce copper oxid in the presence of an electrolyte or which, in other words, is more electro-positive than copper, is properly incorporated or combined with the oxid of copper as a binder therefor, are sufficiently hard, strong, and coherent without baking. Moreover, the disposition of the oxid of copper in such an electrode is more uniform than in electrodes of this character heretofore employed, and consequently the electrode is more uniform in its action in the cell.

Where zinc, metallic iron, iron reduced by hydrogen or other suitable metal is mixed or associated with an ammonium salt, sodium hydroxid, or other suitable electrolyte as a binder for the oxid of copper, the electrode produced is harder and stronger than where the binder consists only of an ammonium salt or other suitable electrolyte; and when zinc is employed in the binder it is unnecessary to provide the electrode with a layer of copper or other conducting material in order to start the action of the cell. However, when an ammonium salt alone is used as a binder, the electrode produced is sufficiently hard and coherent for practical use and is much more simple and less expensive to make.

Electrodes embodying my invention may be made by various methods, but I find the following to be the preferred:

(1) Where an ammonium salt alone is used as the binder for the oxid of copper, substantially 100 parts by weight of cupric oxid is mixed with substantially two parts by weight of the ammonium salt, preferably ammonium chlorid, and then with about 5 parts by weight of water. The cupric oxid is preferably of such fineness that it will all pass through a one hundred mesh screen and 75% of it will pass through a two hundred mesh screen. The mixture is then pressed or molded into an electrode of the desired form in a suitable mold and the electrode is then removed from the mold and thoroughly dried, after which it is ready for use in a cell.

(2) In case a binder consisting of zinc combined with sodium hydroxid is employed, substantially 100 parts by weight of cupric oxid, of the fineness specified in the preceding paragraph, is first mixed with substantially two parts by weight of finely divided zinc and with a sufficient amount of a 20% solution of sodium hydroxid to make the final sodium hydroxid content of electrode when dry about 2% of its weight. The resulting mixture is compressed into an electrode element of the desired form in a suitable mold, and such element is then removed from the mold and thoroughly dried, after which it is ready to be set up in a cell.

(3) Where finely divided iron or iron reduced by hydrogen is combined with an ammonium salt or sodium hydroxid as a binder, the electrode is formed by mixing substantially 100 parts by weight of cupric oxid, of the same fineness as described above, with substantially two parts by weight of finely divided metallic iron or iron reduced by hydrogen, and then with about 5 parts by weight of water. The mixture is then compressed or molded into an electrode of the desired form in a suitable mold, removed from the mold, and then sprayed with a sufficient amount of a solution of the sodium hydroxid or of the ammonium salt, preferably ammonium chlorid, to make the final sodium hydroxid or ammonium salt content of the electrode when dry about 2% of its weight. The solution sprayed on the molded electrode should be at a temperature of approximately forty degrees Fahrenheit and should be nearly saturated with the sodium hydroxid or ammonium salt. After the electrode is sprayed, it is thoroughly dried and is then ready for use in a cell.

Iron reduced by hydrogen generally consists of a mixture of finely divided pure iron and an oxid or oxids thereof. Accordingly the term "iron-containing material" as used in certain of the claims is intended to cover both iron and the oxids thereof.

My copending applications, Serial Nos. 430,782, 430,783 and 430,784, filed December 14, 1920, which are divisions hereof contain claims to subject-matter disclosed in this application, but divisible from the subject-matter of the claims hereof.

It is to be understood that the electrodes specifically described herein as well as the methods for producing the same are merely illustrative of my invention, and that many modifications and changes may be made therein without departing from the spirit of the invention and the scope of the appended claims.

Having now described my invention, what I claim as new and desire to protect by Letters Patent is as follows:

1. An electrode for galvanic batteries, consisting of a depolarizing material and an electrolyte as a binder, substantially as described.

2. An electrode for galvanic batteries comprising a mixture of a depolarizing material and an ammonium salt, substantially as described.

3. An electrode for galvanic batteries, consisting of oxid of copper and an electrolyte as a binder, substantially as described.

4. An electrode for galvanic batteries, consisting of oxid of copper and an ammonium salt as a binder, substantially as described.

5. An electrode for galvanic batteries, consisting of oxid of copper and ammonium chlorid as a binder, substantially as described.

6. An electrode for galvanic batteries, consisting of oxid of copper and a mixture of finely divided metallic material and an electrolyte as a binder, substantially as described.

7. An electrode for galvanic batteries, comprising a strong coherent pressed or molded element consisting of oxid of copper combined with a mixture of finely divided zinc and an electrolyte as a binder, substantially as described.

8. An electrode for galvanic batteries, consisting of oxid of copper combined with a mixture of an electrolyte and a finely divided metallic material which will reduce oxid of copper in an electrolyte as a binder, substantially as described.

9. An electrode for galvanic batteries, consisting of a mixture of approximately 100 parts by weight of oxid of copper and 2 parts by weight of an electrolyte, substantially as described.

10. An electrode for galvanic batteries, consisting of a mixture of approximately 100 parts by weight of oxid of copper and 2 parts by weight of an ammonium salt, substantially as described.

11. An electrode for galvanic batteries, consisting of a mixture of approximately 100 parts by weight of oxid of copper and 2 parts by weight of ammonium chlorid, substantially as described.

12. An electrode for galvanic batteries, consisting of a mixture of approximately 100 parts by weight of oxid of copper, 2 parts by weight of finely divided metallic material which is more electro-positive than copper, and 2 parts by weight of an electrolyte, substantially as described.

13. The method of forming an electrode for a galvanic battery, which consists in incorporating oxid of copper and a solution of an electrolyte in a molded element, and drying such element, substantially as described.

14. The method of forming an electrode for a galvanic battery, which consists in pressing or molding a mixture of oxid of copper and finely divided metallic material which is more electro-positive than copper, applying a solution of an electrolyte to the pressed or molded element thus formed, and then drying such element, substantially as described.

15. The method of forming an electrode for a galvanic battery, which consists in pressing or molding a mixture of oxid of copper and finely divided metallic material which is more electro-positive than copper, spraying the molded element thus formed with a solution of an electrolyte, and then drying the same, substantially as described.

16. The method of forming an electrode for a galvanic battery, which consists in incorporating oxid of copper, finely divided metallic material which is more electropositive than copper, and a solution of an electrolyte in a molded element, and then drying such element, substantially as described.

This specification signed and witnessed this 5th day of April, 1919.

HAROLD N. COX.

Witnesses:
GEORGE P. BOWMAN,
WILLIAM A. HARDY.